(12) United States Patent
Nitsch

(10) Patent No.: US 8,889,050 B2
(45) Date of Patent: Nov. 18, 2014

(54) METHOD FOR PRODUCING A FIBRE COMPOSITE COMPONENT FOR AIR AND SPACE TECHNOLOGY

(75) Inventor: Christian Nitsch, Lilienthal (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/283,179

(22) Filed: Oct. 27, 2011

(65) Prior Publication Data

US 2012/0097323 A1 Apr. 26, 2012

Related U.S. Application Data

(63) Continuation of application No. PCT/EP2010/055451, filed on Apr. 23, 2010.

(60) Provisional application No. 61/214,877, filed on Apr. 28, 2009.

(30) Foreign Application Priority Data

Apr. 28, 2009 (DE) .......................... 10 2009 002 697

(51) Int. Cl.
| | |
|---|---|
| *B29C 70/30* | (2006.01) |
| *B29C 70/08* | (2006.01) |
| *B29C 33/76* | (2006.01) |
| *B29L 31/30* | (2006.01) |
| *B29K 711/02* | (2006.01) |

(52) U.S. Cl.
CPC ............. *B29C 70/30* (2013.01); *B29C 70/086* (2013.01); *Y02T 50/433* (2013.01); *B29L 2031/3076* (2013.01); *Y02T 50/43* (2013.01); *B29K 2711/02* (2013.01); *B29C 33/76* (2013.01)
USPC ......................................... 264/257

(58) Field of Classification Search
CPC ............................. B29C 33/76; B29C 53/824
USPC .......................................................... 264/257
See application file for complete search history.

(56) References Cited

U.S. PATENT DOCUMENTS

| | | | | |
|---|---|---|---|---|
| 1,762,138 A | * | 6/1930 | Grupe ......................... | 428/218 |
| 2,414,125 A | | 1/1947 | Rheinfrank | |

(Continued)

FOREIGN PATENT DOCUMENTS

| | | |
|---|---|---|
| CN | 101484289 | 7/2009 |
| DE | 102006031334 A1 | 1/2008 |

(Continued)

OTHER PUBLICATIONS

Office Action for German Application No. DE 10 2009 002 697 dated Nov. 26, 2009.

(Continued)

*Primary Examiner* — Yogendra Gupta
*Assistant Examiner* — Alison Hindenlang
(74) *Attorney, Agent, or Firm* — Jenkins, Wilson, Taylor & Hunt, P.A.

(57) ABSTRACT

A method for producing a fiber composite component, in particular for aerospace, the method comprising the following steps: forming a mold core from a material comprising cork by a molding tool to establish an outer geometry of said mold core; arranging the so formed mold core adjacent to an at least partly hardened stiffening element on a base element of said composite component to be produced for the shaping of at least one molded portion of said fiber composite component to be produced; and multistage exposure of at least said molded portion to heat and/or pressure to produce said fiber composite component; a corresponding mold core and a corresponding fiber composite component.

8 Claims, 8 Drawing Sheets

(56) References Cited

U.S. PATENT DOCUMENTS

| | | | | |
|---|---|---|---|---|
| 3,582,422 | A | * | 6/1971 | Wilkins .................. 156/222 |
| 4,070,021 | A | * | 1/1978 | Cecka et al. .............. 264/45.3 |
| 4,124,670 | A | | 11/1978 | Cecka et al. |
| 2010/0007044 | A1 | | 1/2010 | Jacob et al. |
| 2011/0076461 | A1 | | 3/2011 | Jacob et al. |

FOREIGN PATENT DOCUMENTS

| | | |
|---|---|---|
| DE | 102006031326 B4 | 9/2010 |
| GB | 910821 A | 11/1963 |
| JP | 57-195656 | 12/1982 |
| JP | 61199938 A | 9/1986 |
| JP | 02-088230 | 3/1990 |
| JP | 05-131474 | 5/1993 |
| JP | 2000-025103 | 1/2000 |
| JP | 2002-240059 | 8/2002 |
| JP | 2006-123402 | 5/2006 |
| JP | 2007-118598 | 5/2007 |
| JP | 2007-525345 | 9/2007 |
| SU | 780947 | 11/1980 |
| WO | WO 2005/105402 A1 | 11/2005 |
| WO | WO 2008/003721 A1 | 1/2008 |
| WO | WO 2009/122058 | 10/2009 |

OTHER PUBLICATIONS

International Search Report for PCT Application No. PCT/EP2010/055451 dated Nov. 30, 2010.
Japanese Office Action for Application No. 2012-507693 dated Feb. 28, 2013.
Russian Decision to Grant for Application No. 2011143580/05 May 12, 2013.
Chinese Office Action for Application No. 201080029021.6 dated Aug. 27, 2013.

* cited by examiner

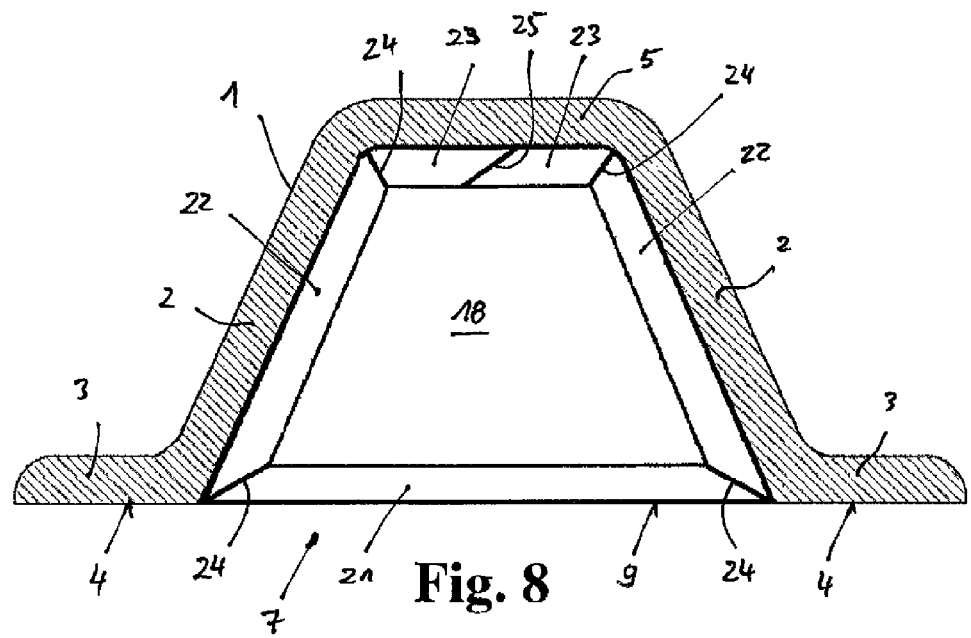
Fig. 8
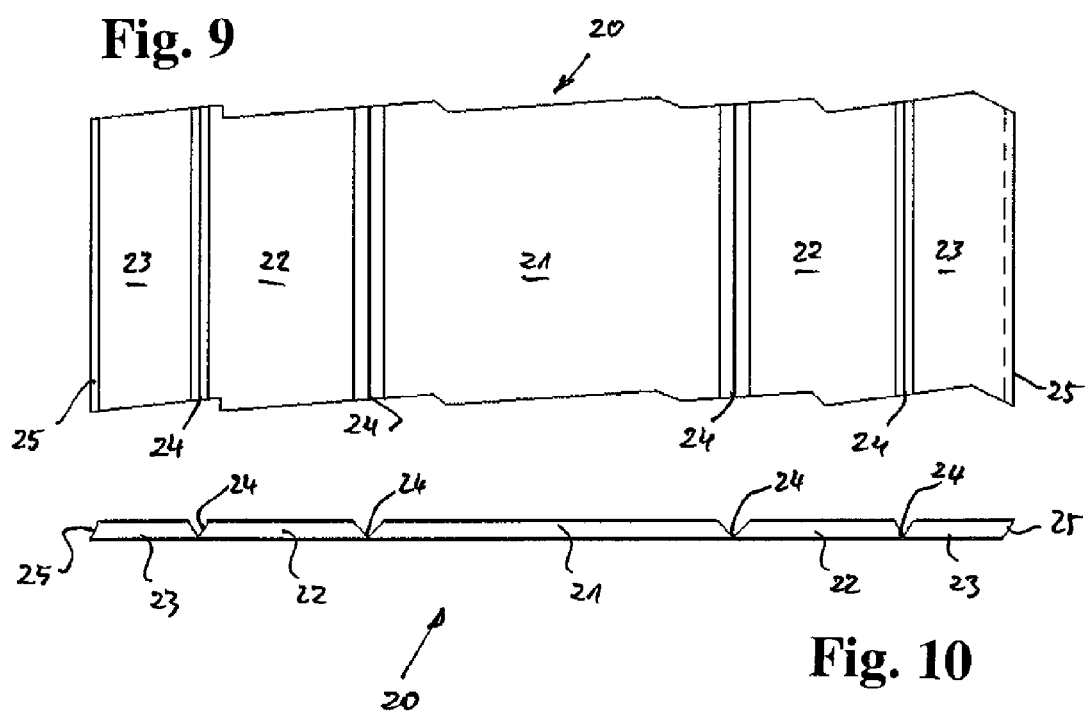
Fig. 9
Fig. 10

METHOD FOR PRODUCING A FIBRE COMPOSITE COMPONENT FOR AIR AND SPACE TECHNOLOGY

CROSS-REFERENCE TO RELATED APPLICATIONS

This application is a continuation of and claims priority to PCT/EP2010/055451 filed Apr. 23, 2010 which claims the benefit of and priority to U.S. Provisional Application No. 61/214,877, filed Apr. 28, 2009 and German Patent Application No. 10 2009 002 697.5 filed Apr. 28, 2009, the entire disclosures of which are herein incorporated by reference.

FIELD OF THE INVENTION

The present invention relates to a method for producing a fibre composite component, in particular for the aviation and aerospace industry, to a mould core for producing a fibre composite component of this type and to a fibre composite component which has at least one reinforcing element which is produced by a mould core of this type and/or by a method of this type.

Although the present invention and the problem on which it is based can be applied to any fibre composite components, they will be described in more detail in the following with reference to planar carbon fibre reinforced plastics material (CFRP) components which are reinforced with reinforcing elements, also known as stringers, for example fuselage shells of an aircraft.

It is generally known in the field of aviation to reinforce CFRP skin shells with CFRP stringers to withstand the high loads while keeping the weight as low as possible. In this respect, substantially two types of stringers are distinguished: T-stringers and omega stringers.

The cross-section of T-stringers is composed of the foot and the web. The foot forms the joining surface to the skin shell. The use of skin shells reinforced with T-stringers is widespread in aircraft construction.

Omega stringers have a more or less hat-shaped profile and the feet thereof are joined to the skin shell. Omega stringers can be bonded to the cured or uncured shell either in a cured or uncured state or are cured at the same time as the shell, wet-in-wet. In this respect, substantially three different joining methods are distinguished:
1. Secondary bonding:
   Rigid/rigid adhesive bonding with adhesive film
2. Co-bonding:
   Rigid/wet adhesive bonding optionally with adhesive film
3. Co-curing:
   Wet/wet adhesive bonding.

Intermediate states, such as part-cured, are also possible. However, supporting cores or mould cores are necessary to produce uncured or cured skin shells reinforced with cured and/or uncured omega stringers. On the one hand, the function of the supporting core or mould core is to fix and support the uncured fibre semi-finished products, located under the cavity of the cured stringers, of the skin shell and/or the unstable fibre semi-finished products of the stringers in the desired omega shape during the production process. On the other hand, the supporting core or mould core transmits the necessary autoclave pressure onto the uncured joining partner in the co-bonding or co-curing methods.

Hitherto, provision has been made to use, for example profiled tubular films consisting of for example polyamide (PA) or fluoropolymer (FEP) or hollow profiled parts consisting of silicone rubber in an autoclave process for adhesively bonding the cured omega stringers to the uncured skin as the supporting core. The autoclave pressure acts internally on the tubular film or the silicone profiled part which, in turn, transmits the autoclave pressure onto the uncured skin laminate under the omega stringer. After the curing process, the supporting cores are removed.

The supporting core materials investigated hitherto do not always result in a reproducibly good component quality. The necessary inner contour cannot always be produced. So-called "tube bursters" result in porous laminates or in unsatisfactory adhesively bonded joints, and thus entail expensive reworking or result in rejected material.

There is a further problem in the production of skin shells reinforced with omega stringers in that the presently used materials for the supporting or mould core are cost-intensive (in particular hollow profiled parts made of silicone rubber due to a short immobilisation time and possible damage) and they can only be removed with difficulty after the omega stringers have formed (for example due to film inclusions), so that the material remaining in the stringers contributes disadvantageously to the total weight of the aircraft. Furthermore, pore accumulations and fibre deflections can occur in the skin field which can adversely affect the uniformity, strength and force path in the skin field structure.

For an acoustic muffling of noise, it is known to apply a CFRP and rubber compound to the skin fields between the stringers.

SUMMARY OF THE INVENTION

Against this background, the object of the present invention is to provide a more cost effective and lighter fibre composite component, in particular for the aerospace industry.

Accordingly, a method for producing a fibre composite component, in particular for the aerospace industry, having the following steps is provided:

First of all, a mould core is formed from a material containing cork using a core tool to establish an outer shape of the mould core. This mould core produced thus is then arranged on a base component of the fibre composite component to be produced such that it rests against an at least part-cured reinforcing element, to form at least one mould portion of the fibre composite component to be produced. At least the mould portion is charged in multiple stages with heat and/or pressure to produce the fibre composite component.

In a further method for producing a fibre composite component, in particular for the aviation and aerospace industry, a mould core is formed from a material containing cork using a core tool to establish an outer shape of the mould core, this mould core then being arranged on a base component of the fibre composite component to be produced. At least one fibre semi-finished product is then laid down at least in portions on the base component, to form at least one mould portion of the fibre composite component to be produced. This is followed by a multi-stage charging of at least the mould portion with heat and/or pressure to produce the fibre composite component.

Furthermore, a mould core for producing a fibre composite component, in particular a reinforcing element, for example a stringer, is provided on a base part with a core material which contains cork.

In addition, a fibre composite component with at least one reinforcing element, in particular for the aviation and aerospace industry is provided, which is produced by the mould core according to the invention and/or by the method according to the invention.

One of the ideas on which the present invention is based is that the mould core is formed from a cork-containing material.

Thus, compared to the approaches mentioned at the beginning, the present invention has the advantage that the fibre composite component can be produced by a more cost effective mould core. The mould core can also have a plurality of functions.

The reinforcing element can have a cavity and can be an omega stringer, for example. However, cavities with other cross sections, for example trapezoidal, triangular, annular, undulating, etc. are also possible. Reinforcing elements without a cavity, for example T-stringers, U-stringers, L-stringers can also be supported laterally, for example by the mould core functioning as a supporting core. The mould core is then partly adapted, for example as an outer supporting core, or fully adapted, for example as an inner supporting core, in each case to these shapes, and has the respective cross-sectional shape.

First of all, the mould core, resting against a cured or part-cured reinforcing element, can be applied with this reinforcing element to an uncured, part-cured or cured base component as the supporting core of the reinforcing element.

Furthermore, the mould core can be arranged on a base component and used to produce a reinforcing element on an uncured, part-cured or cured base component, in that fibre semi-finished products for the reinforcing element to be produced are laid down on the mould core.

In a function purely as a supporting core, after the fibre composite component has been cured in an autoclave, the supporting core is removed from the reinforcing element and/or detached therefrom. The supporting core is dimensionally stable and simultaneously resilient, which results in a good quality of the fibre composite component. Furthermore, it can be used several times and thus reduces costs. Its relatively low weight means that it can be easily handled. Furthermore, it is recyclable.

In a further function, the mould core remains as a so-called "flying supporting core" in and/or on the reinforcing element. In addition to the above-mentioned advantages, there is also the advantage of an acoustic muffling of noise, and it is possible to at least partly dispense with an additional sound insulation using conventional material. A fibre composite component in the form of a fuselage shell exhibits an improved impact behaviour and an improved burn-through behaviour (which can also be increased by adding flame retardants) due to the remaining supporting cores made of cork in and/or on the reinforcing elements. Furthermore, an at least partial thermal insulation is thus made possible.

Advantageous configurations and improvements of the present invention are provided in the subclaims.

When the reinforcing element is at least part-cured, i.e. pre-cured or cured, the mould core can be provided with at least one fixing element for fixing the mould core on the reinforcing element. In particular, if the mould core remains in the component, this fixing can be carried out, for example in the form of adhesive tapes and/or resin films and/or adhesive films which are applied locally and/or continuously.

If the mould core is to be removed again, it is preferable for the at least one fixing element to be attached to the mould core and to cooperate with at least one fixing aid element which can be attached to the reinforcing element such that it can be removed therefrom, and for example the at least one fixing element and the at least one fixing aid element are formed by magnetic strips. In this respect, for example the mould core can be provided with a magnetic strip on one or more side faces, which are provided to rest against the reinforcing element. This magnetic strip can be affixed and/or introduced into a corresponding (for example milled or moulded) groove or recess. This groove or recess corresponds to the geometric cross section of the magnetic strip. This provides the advantage of a simple insertion of the magnetic strip and a fixing with nothing left over. In the case of thin-walled mould cores, a local thickening can be made in the region of the attachment or insertion of the magnetic strip. The reinforcing element is then provided on the corresponding side/surface with a removable metal strip, for example a sheet metal strip which cooperates with the magnetic strip. The metal strip as a fixing aid can also be a magnetic strip. An advantage here is that this fixing aid is also simple to apply and remove.

According to a preferred embodiment of the invention, reinforcing means are arranged in the region of transitions, to be configured with sharp edges, of the outer shape of the mould core to be configured. These reinforcing means, in particular corner profiled parts have the advantage that they form the sharp edges and corners, it being possible for the mould core to be provided in this region with fillets which are easy to produce.

A separating layer is preferably applied to or produced on the mould core which prevents the material of the reinforcing element or of the fibre semi-finished product and/or of a matrix from adhering to the mould core. The separating layer can be directly produced, for example by machining procedures by means of grinding and/or polishing. However, the separating layer can also consist of a separating film and/or a liquid separating agent and can be additionally applied. This facilitates the removal of the mould core after the at least part-curing of the portion, produced by the mould core, of the fibre composite component.

The term "fibre semi-finished products" is understood as meaning woven fabrics, interlaid scrims and fibre mats. These are provided with a matrix, for example an epoxy resin and then cured in an autoclave, for example.

For this, it is possible to use hand laminating, prepreg, transfer moulding and/or vacuum infusion processes, also in conjunction with a winding method.

According to a further preferred development of the invention, the mould core is arranged on a base part consisting of fibre composite semi-finished products and/or is at least partly surrounded by fibre semi-finished products to form at least one mould portion of the fibre composite component. Thus, base parts, for example skin shells, pressure shells etc. can advantageously be formed with omega stringers, and also with other reinforcing elements. As an alternative or in addition, it is also possible for separate fibre composite components to be produced, the shape of which is completely defined by the mould core.

During the production of an omega stringer, for example, the mould core is cured and then can be removed from said omega stringer in the longitudinal direction thereof, which is facilitated by the separating layer. The mould core is prevented from being damaged in that it is formed with at least one reinforcing layer, consisting for example of tear-proof woven fabric and/or with a tear-proof separating film.

According to a further preferred development of the invention, the mould core is configured with at least one undercut. This undercut is preferably located in the longitudinal direction of the mould core. Thus, a mould core of this type makes it possible to produce stringers with a cross section which varies in the longitudinal direction thereof.

The mould core can be formed by a compression moulding process. In this process, for example cork powder is mixed with a binder and filler consisting of for example rubber granules and is compressed by a mould into the desired shape of the mould core. It is also possible for a mould core produced thus to be brought into its final dimensions by material-removing machining processes, for example by cutting, grinding and polishing.

The mould core can also be composed of at least two core segments, for example two segments produced by compression moulding or by another method, the segments being adhesively bonded together. Of course, thereafter they can also be finished.

The mould core can also be formed as a hollow core with a core inner space. In this case, side walls consisting of individual plates can be assembled to produce the final shape. It is also possible for the mould core to be compression moulded, in which case the inner space is filled with a corresponding core.

In another embodiment, the formation of the mould core as a hollow core with a core inner space comprises the following sub-steps: provision of a solid profiled part which is produced, for example in a compression moulding process. The external and internal contours of the mould core are produced, for example by milling and/or cutting tools. The external shape of the milling and/or cutting tool for forming the inner space of the core corresponds to the geometrical cross section of the core inner space. The rotating milling and/or cutting tool is moved in the solid profiled part in the longitudinal direction thereof, a longitudinal slot being made simultaneously in the head wall of the mould core produced thus by the shank of the milling and/or cutting tool. This slot can be closed for example either by an adhesively bonded-on strip of a cork-containing material and/or by a fixing element with magnetic strips.

In another embodiment, the formation of the mould core comprises the following sub-steps: provision of a sheet material which is produced, for example by calendering or other compression moulding processes. Blanks are then cut out which are folded by a folding tool and are then joined by the core tool. In this respect, the core tool acts as the outer mould. A further core can be introduced into an inner space, in which case when the sheet material is folded, this core can act as a type of wind-up core. For folding purposes, the sheet material can be correspondingly scored and/or provided with notches.

A mould core according to the invention for producing a fibre composite component, in particular a reinforcing element in/on a base component in the aviation and aerospace industry is formed using a cork-containing material and can be produced as described above.

A fibre composite component which has at least one reinforcing element, in particular for the aviation and aerospace industry is produced using a mould core described above.

In a further embodiment, in the case of the fibre composite component, the mould core is arranged resting against the at least one reinforcing element as a sound absorber and/or as a thermal insulating element.

BRIEF DESCRIPTION OF THE DRAWINGS

In the following, the invention will be described in more detail with reference to the embodiments illustrated in the schematic figures of the drawings, in which:

FIG. 8 is a schematic cross-sectional view of a fourth embodiment of the mould core according to the invention with the reinforcing element according to FIG. 1;

FIG. 9 is a schematic plan view of a sheet material for producing the fourth embodiment according to FIG. 8;

FIG. 10 is a side view of the sheet material according to FIG. 9;

FIG. 15b is a schematic, perspective view of a machining of the core blank according to FIG. 15a.

DESCRIPTION OF EXEMPLARY EMBODIMENTS

Figure 1:
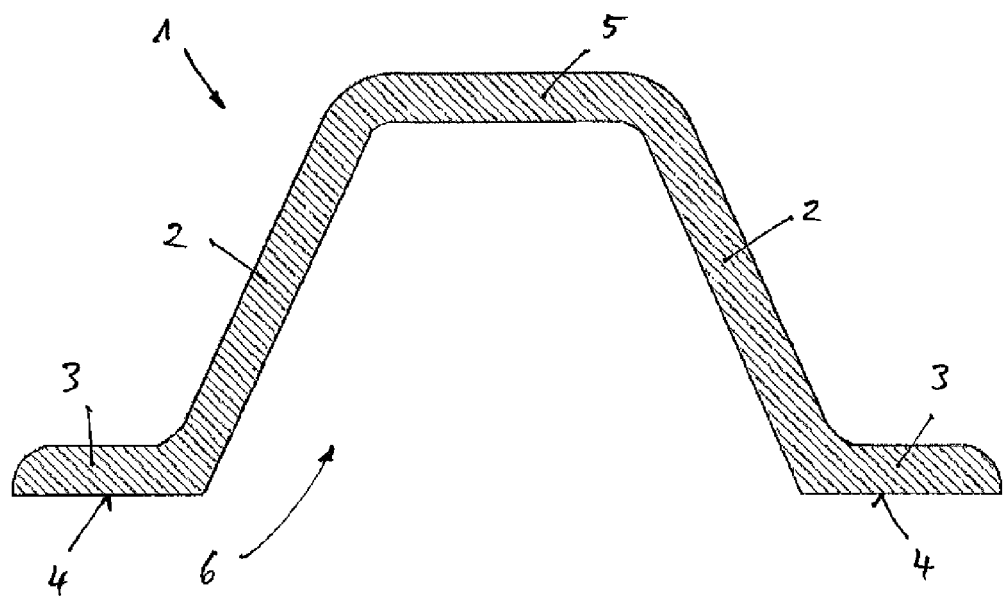
FIG. 1 is a schematic cross-sectional view of a reinforcing element.

In all the figures of the drawings, identical or functionally identical elements have each been given the same reference numerals, unless indicated otherwise.

Figure 2:
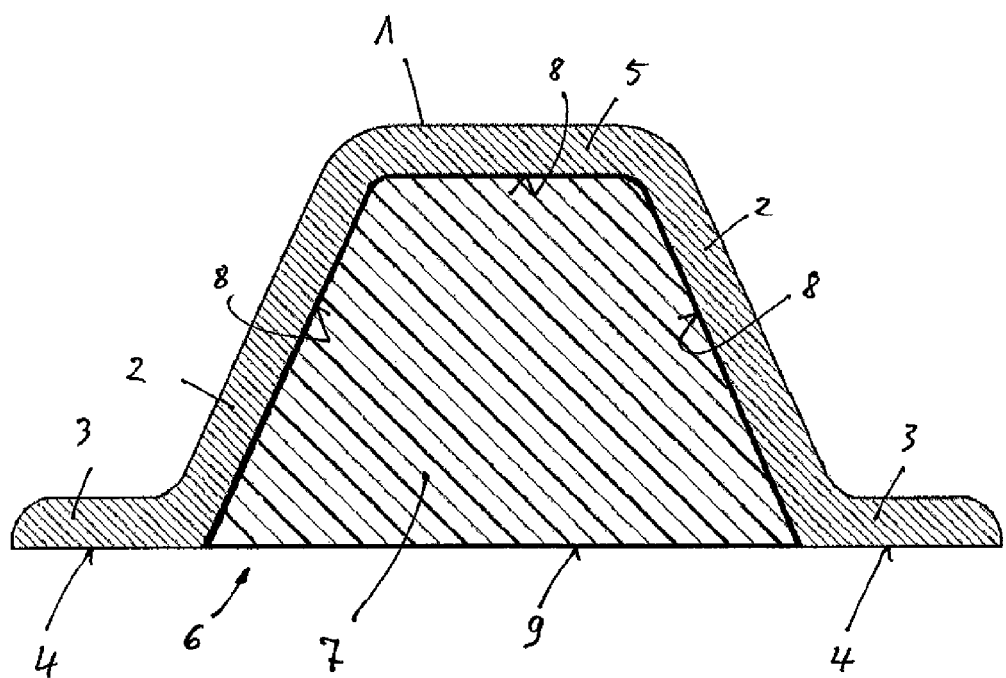
FIG. 2 shows the view of FIG. 1 with a cross section of a first embodiment of a mould core according to the invention.
Figure 3:
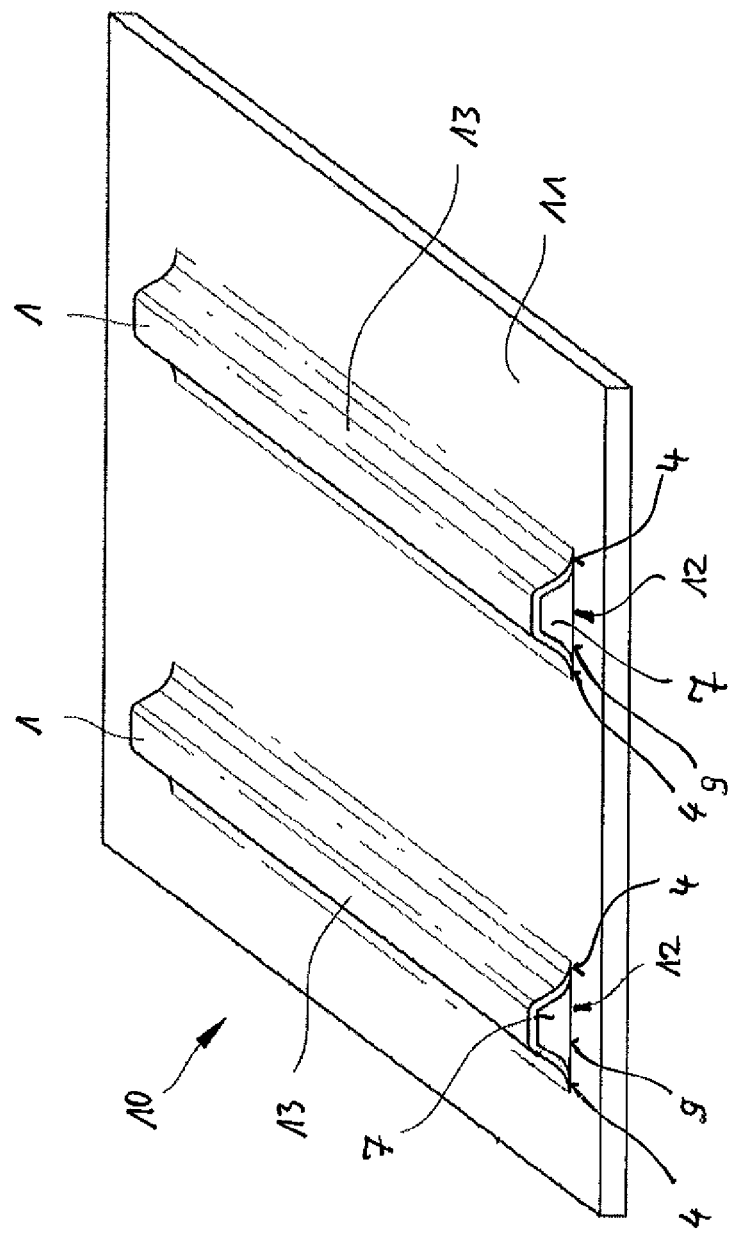
FIG. 3 is a schematic perspective view of an embodiment of a fibre composite component according to the invention during production according to a first method of the invention.

Reference will firstly be made to FIGS. 1 to 3.

FIG. 1 is a schematic cross-sectional view of a reinforcing element 1. FIG. 2 shows the view according to FIG. 1 with a cross section of a first embodiment of a mould core 7 according to the invention and FIG. 3 is a schematic perspective view of an embodiment of a fibre composite component 10 according to the invention during production according to a first method of the invention.

In this embodiment, the reinforcing element 1 is a so-called omega stringer with a kind of hat-shaped profile, as shown in FIG. 1, and it stands vertically on the plane of the drawing. A perspective view is provided in FIG. 3, where two reinforcing elements 1, for example, are illustrated which are attached for reinforcement purposes to a base component 11, for example a shell component or a fuselage skin of an aircraft and spacecraft (not shown).

The reinforcing element 1 (see FIG. 1) has two opposite webs 2 which run obliquely upwards towards one another and are joined together at their upper ends by a horizontal connection, here called a head 5. Attached to the lower ends of the webs 2 are in each case outwardly directed, horizontally extending feet 3 having lower sides. The lower sides are provided as joining faces 4 for resting on and attaching to the base component 11 which is to be reinforced (see FIG. 3). The webs 2 and the head 5 enclose an approximately trapezoidal cavity 6, the lower opening of which is closed by the base component 11 (see FIG. 3).

In FIG. 3, the reinforcing elements 1 form with the base component 11 a mould portion 13 of the fibre composite component 10. In this respect, in each case an inner surface portion 12 is arranged on the surface of the base component 11 below a respective inner space 6 of the reinforcing element 1. Arranged in the inner spaces 6 of the reinforcing elements 1 is a respective mould core 7, as illustrated in cross section in FIG. 2. However, it is also possible for a plurality of mould cores 7 to be arranged in tandem.

In this example, the mould core 7 completely fills the cavity 6 of the reinforcing element 1, side faces 8 of the mould core 7 resting against the insides of the webs 2 and of the head 5 of the reinforcing element 1 and contacting them. A base surface 9 of the mould core 7 aligns with the respective joining surfaces 4 of the feet 3 of the reinforcing element 1.

In this first embodiment of the method according to the invention, the reinforcing element 1 has already been produced at a different site, for which the mould core 7 can also be used and can be at least part-cured. In this context, the term "part-cured" means that the reinforcing element 1 has hardened sufficiently that it can be transported from its production site onto the base component 11 which, in this embodiment, is still uncured. In this respect, the mould core 7 is located in the cavity 6 of the reinforcing element 1. When it is positioned on the base component 11, the base surface 9 of the mould core covers the inner surface portion 12 of the surface of the uncured base component 11 between the joining surfaces 4 of the feet of the reinforcing element 1. The reinforcing element 1 is joined to the base component 11 by the joining surfaces 4 in a further step of the method.

For this, at least the mould portions 13 are charged in multiple stages in an autoclave with heat and/or pressure to produce the fibre composite component 10 reinforced by the reinforcing element 1, with the joining surfaces 4 being joined to the base component 11. In this respect, various production methods can be used. In this case, the so-called vacuum infusion process is preferably selected. However, the prepreg process can also be used here just as well.

The inner surface portions 12 of the surface of the base component 11 are supported and held by the base surfaces 9 of the mould cores 7 such that no pore accumulations and fibre deflections occur in these skin fields of the inner surface portions 12. This proves to be advantageous for the uniformity, strength and force path in the skin field structure.

In the following, the production of the mould cores 7 will be described with reference to FIGS. 4 to 10.

Figure 4:
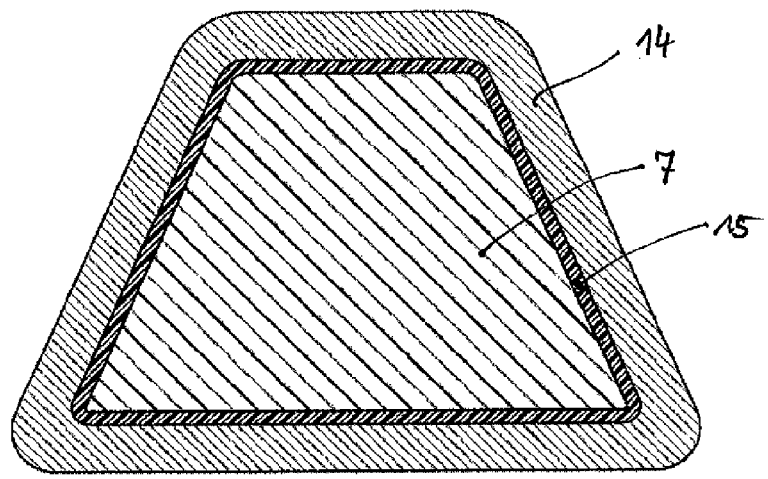
FIG. 4 is a schematic cross-sectional view of the first embodiment, of the mould core of the invention according to FIG. 2 in a mould tool or core tool.

FIG. 4 is a schematic cross-sectional view of a first embodiment of a mould core 7 according to the invention.

The mould core 7 consists of a core material which contains cork, for example cork powder with binders and fillers. A compound of cork granules and rubber granules is also possible, which is called rubber cork. Also possible is a composite material consisting of at least one cork layer and at least one rubber layer. This core material is introduced into a core tool 14 and brought into the desired shape with the cross section of the mould core 7, in this case an approximately trapezoidal shape. This can be carried out by compression moulding, for example. Applying heat can activate the binders, as for example rubber by vulcanizing substances. Of course, other methods are also possible.

In this example, the mould core 7 is surrounded by a separating layer 15 which completely encloses it on all sides and is suitable for its production process and further machining and processing in respect of the processing temperature and the processing pressure. The separating layer 15 is used to cleanly separate the mould core 7 both from the core tool 14 and from the reinforcing element 1 and the base component 11 during removal from the mould. The surface quality of the separating layer 15 is significant for the surface of the inner surface portion 12 (see FIG. 3). The separating layer 15 can be produced directly on the part by, for example grinding and polishing the mould core 7. It is also possible to apply suitable coatings, made for example of a plastics material and/or a liquid separating agent and/or a separating film.

In another configuration, it is also possible for the mould core 7 to be cut to the required cross section. The core tool 14 can then be seen schematically as a cutting tool, for example.

Figure 5:
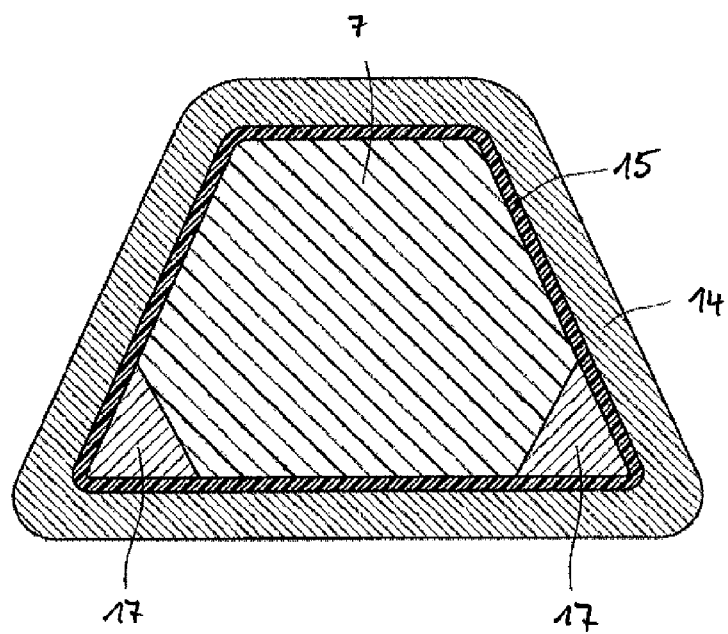
FIG. 5 shows a variation of the first embodiment according to FIG. 4.

FIG. 5 shows the core tool 14 with a mould core 7 in a variation with a different cross section, in which the lower corner regions have been replaced by reinforcing means 17, for example by strips of metal, plastics material or cork and/or rubber cork. Thus, the mould core 7 can obtain particularly well formed corner regions in that the reinforcing means 17 are produced in a separate tool. When the mould cores 7 are removed from the reinforcing elements 1, these reinforcing means 17 can also be removed or can remain in the reinforcing element 1, depending on the configuration.

Figure 6:
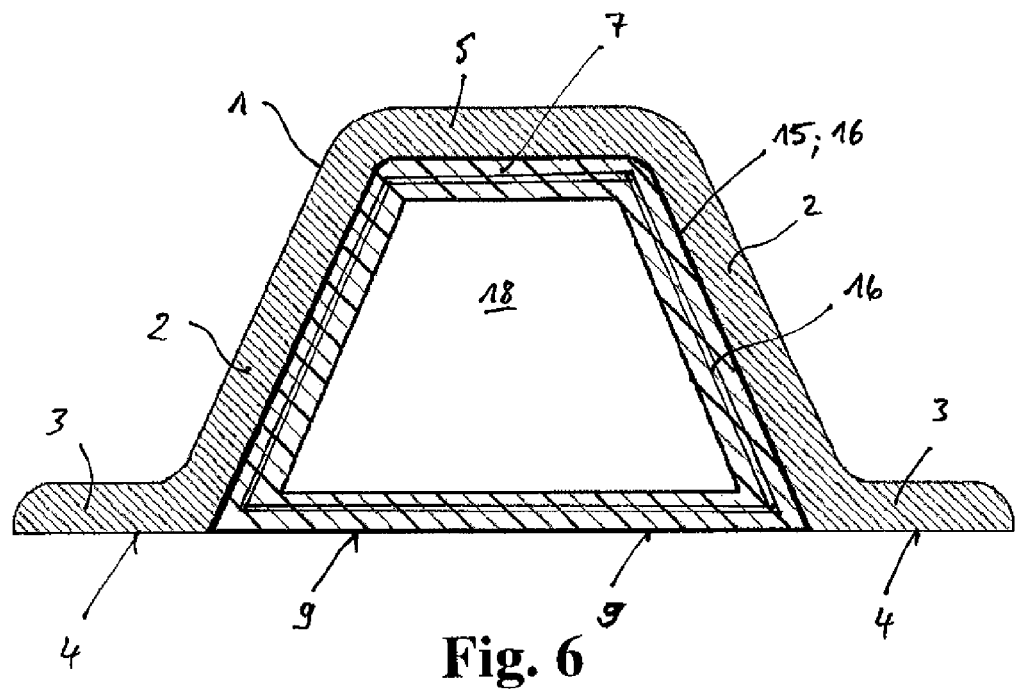
FIG. 6 is a schematic cross-sectional view of a second embodiment of the mould core according to the invention with the reinforcing element according to FIG. 1.

FIG. 6 is a schematic cross-sectional view of a second embodiment of the mould core 7 according to the invention with the reinforcing element 1 according to FIG. 1. In this embodiment, the mould core 7 is formed with a core inner space 18 which can be filled with a further core during production of the mould core 7. Due to its low weight, this type of mould core 7 is suited, for example to remaining in the reinforcing element 1, a possible core being removed from the core inner space 18.

In this case, the mould core 7 is used with a reinforcing layer 16 which is, for example, a tear-proof layer of woven fabric. However, it can also be a different reinforcing material, for example a tear-proof separating film. This reinforcing layer 16 can also be used instead of or as the separating layer 15 (see FIGS. 4 and 5). The reinforcing layer 16 is particularly advantageous when the mould core 7 is pulled out on removal from the mould, as it is protected from damage by said layer and its re-usability is increased.

Figure 7:
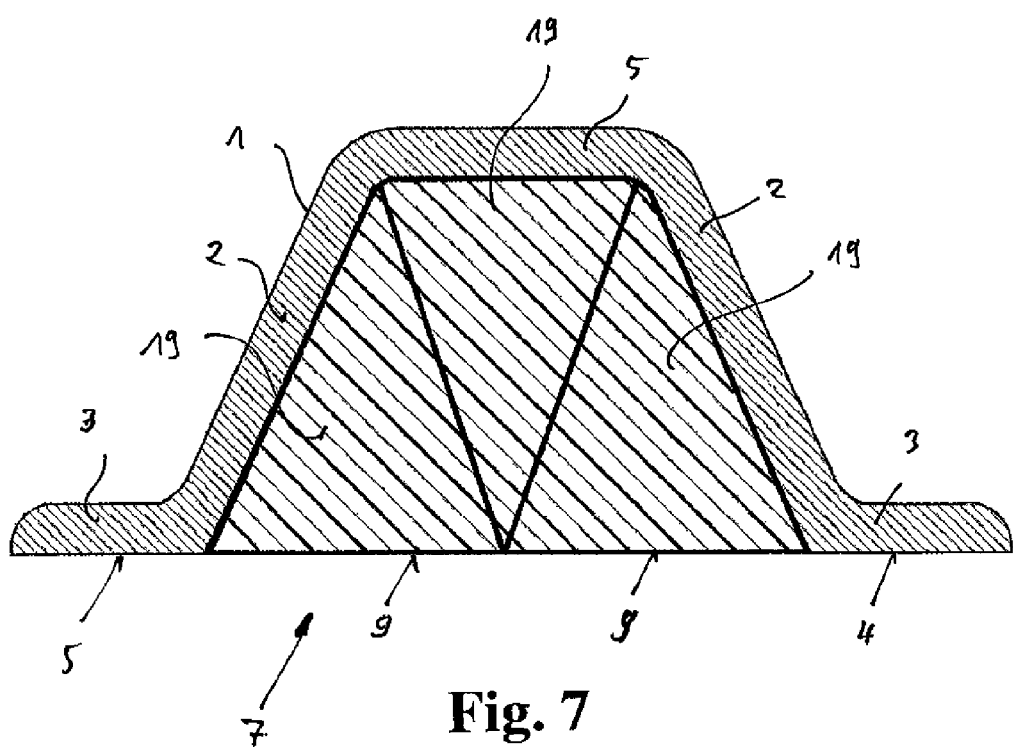
FIG. 7 is a schematic cross-sectional view of a third embodiment of the mould core according to the invention with the reinforcing element according to FIG. 1.

FIG. 7 is a schematic, cross-sectional view of a third embodiment of the mould core 7 according to the invention with the reinforcing element 1 of FIG. 1, and in this case, the mould core 7 is composed of three core segments 19. Here, the core segments 19 each have triangular cross sections, but are not restricted thereto.

The core segments 19 are rigidly joined, for example adhesively bonded to one another, the adhesive being suitable for the temperatures and pressures during production of the fibre composite component 10 and resistant to the matrix materials used. This embodiment is suitable for relatively large core cross sections, for example. The core segments 19 can be produced by simple core tools 14.

FIG. 8 is a schematic cross-sectional view of a fourth embodiment of the mould core 7 according to the invention with the reinforcing element 1 of FIG. 1. In this connection, FIG. 9 is a schematic plan view of a sheet material 20 for producing the mould core 7 of the fourth embodiment according to FIG. 8 and FIG. 10 is a side view of the sheet material 20 according to FIG. 9.

Like the second embodiment according to FIG. 6, the mould core 7 has a core inner space 18. The mould core 7 has a base wall 21, the outer surface of which forms the base surface 9 of the mould core. Joined to the ends of the base wall 21 is a respective side wall 22 in a fold portion 24, the outer surfaces of the side walls 22 coming to rest against the inner surfaces of the webs 2 of the reinforcing element 1. The ends of the side walls 22 are also joined in each case to a head wall 23 by means of fold portions 24. With their outer surfaces, the head walls 23 form a contact surface against the inner surface of the head 5 of the reinforcing element 1. The free ends of the head walls 23 overlap one another and are joined together, for example adhesively bonded together, in a joining portion 25.

According to the fourth embodiment, first of all the mould core 7 is cut to size as a folded core from a sheet material 20, illustrated in FIG. 9. In FIG. 9, the sheet material 20 extends upwards and downwards in a specific length which corresponds to the length of the mould core 7 or is cut to this length. Along the width of this sheet material 20, i.e. here in FIG. 9 from left to right, the individual portions mentioned above under FIG. 8 are formed by a scoring and/or notching of the fold portions 24. In this embodiment as well, the joining portion 25 is cut obliquely for the overlap. The fold portions 24 can also be provided with for example adhesive and/or fixed with adhesive strips after a folding procedure. FIG. 10 is a side view of the sheet material 20. Here it can be seen that in this configuration, the fold portions 24 have V-shaped notches. The sheet material can optionally be provided on one and/or both sides with a separating film and/or an autoclave film.

The sheet material 20 prepared thus can then be subjected to a folding procedure according to the cross section of the mould core 7 of FIG. 8, in that for example the side walls 22 with the head walls 23 attached thereto are folded on the left and right around the base wall 21 respectively in a clockwise direction and in an anti-clockwise direction, the free ends of the head walls 23 overlapping in the joining portion 25 and being attached to one another. The folding procedure can be carried out automatically in a suitable folding tool, for example in the longitudinal direction of the mould core (vertically to the plane of the drawing of FIG. 9). In this respect, a core with the cross section of the core inner space 18 can serve as a further folding tool, which is easy to imagine.

Figure 11:
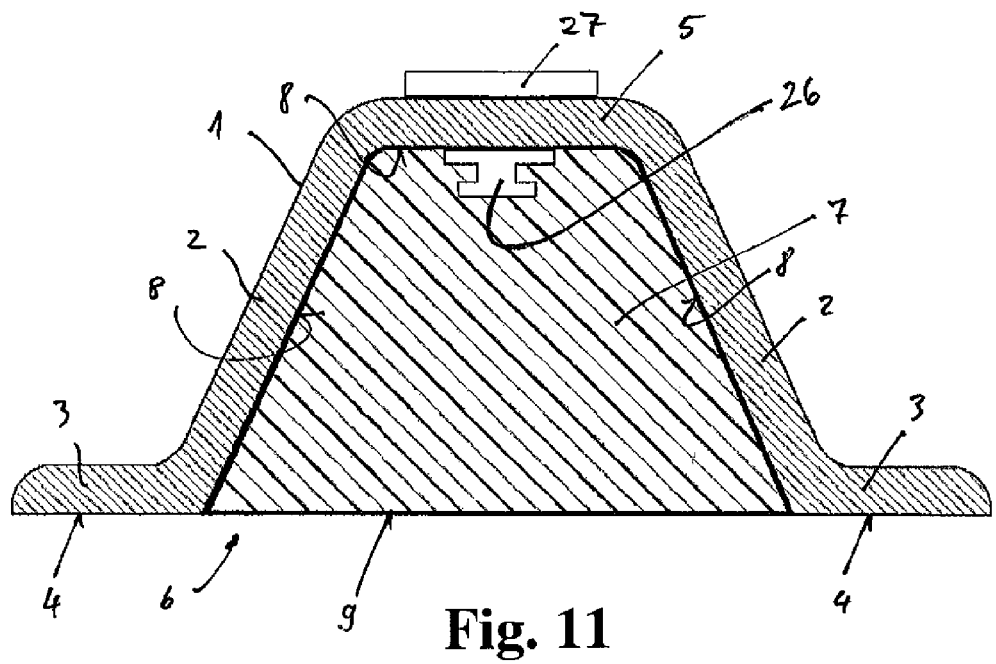
FIG. 11 is a schematic illustration of a fixing of the mould core according to the first embodiment and of the reinforcing element according to FIG. 1.
Figure 12:
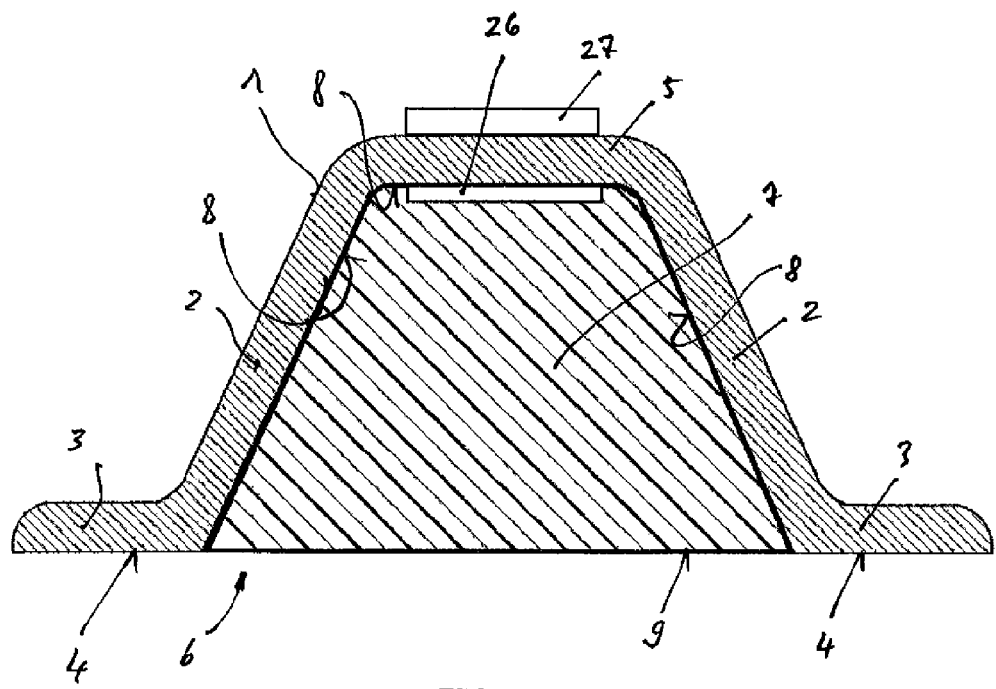
FIG. 12 shows a variation of the fixing illustrated in FIG. 11.

A fixing of the reinforcing element 1 and of the mould core 7 may be required during transportation of the reinforcing elements 1 with internally arranged mould cores 7 as supporting cores and during the arrangement on the base component 11 and for other purposes. FIG. 11 schematically shows a fixing of the mould core 7 according to the first embodiment and of the reinforcing element 1 according to FIG. 1, and FIG. 12 illustrates a variation of the fixing shown in FIG. 11. Since with an at least part-cured reinforcing element 1, the inner surfaces in the cavity 6 are already prefabricated or are ready-formed, it is possible to provide at least one of the side faces 8 of the mould core 7 which rest against the reinforcing element 1 with a fixing element 26. In an embodiment which is not shown, the fixing element 26, just as an adhesive tape, can be attached either to a side face 8 and/or to an inner surface of the cavity 6 of the reinforcing element 1. In the configuration shown in FIGS. 11 and 12, the fixing element 26 is in each case a magnetic strip or a metal strip/metal sheet. In FIG. 11, the fixing element 26 is provided with a cross section which makes it possible for the fixing element 26 to be introduced in the longitudinal direction of the mould core 7, in which case, in a vertical direction thereto, it is held positively in the mould core due to the cross-sectional shape. Here, a recess having a cross section corresponding to the fixing element 26 has been made in the upper portion of the mould core 7, a surface of the fixing element 26 resting against the inner surface of the head 5 of the reinforcing element 1. Attached to the opposite outer side of the head 5 is a fixing aid element 27 which cooperates with the fixing element 26, in this case by magnetic forces. In this embodiment, the fixing aid element 27 is a sheet metal strip which can be magnetised. This allows a fixing with nothing left over of mould core 7 and reinforcing element 1, the fixing aid element 27 being attached in a lightly adhesive manner. The fixing aid element 27 is removed again before passage through the autoclave after the reinforcing element has been positioned on the base component 11. The fixing element 26 can also be bonded in a simple recess, as shown in FIG. 12, in the side face 8 of the mould core 7. The fixing element 26 and fixing aid element 27 can both be magnetic strips. In the case of a thin-walled mould core 7, for example in the second embodiment according to FIG. 6, the region in which the fixing element 26 is provided with a recess must be thickened.

Figure 13:
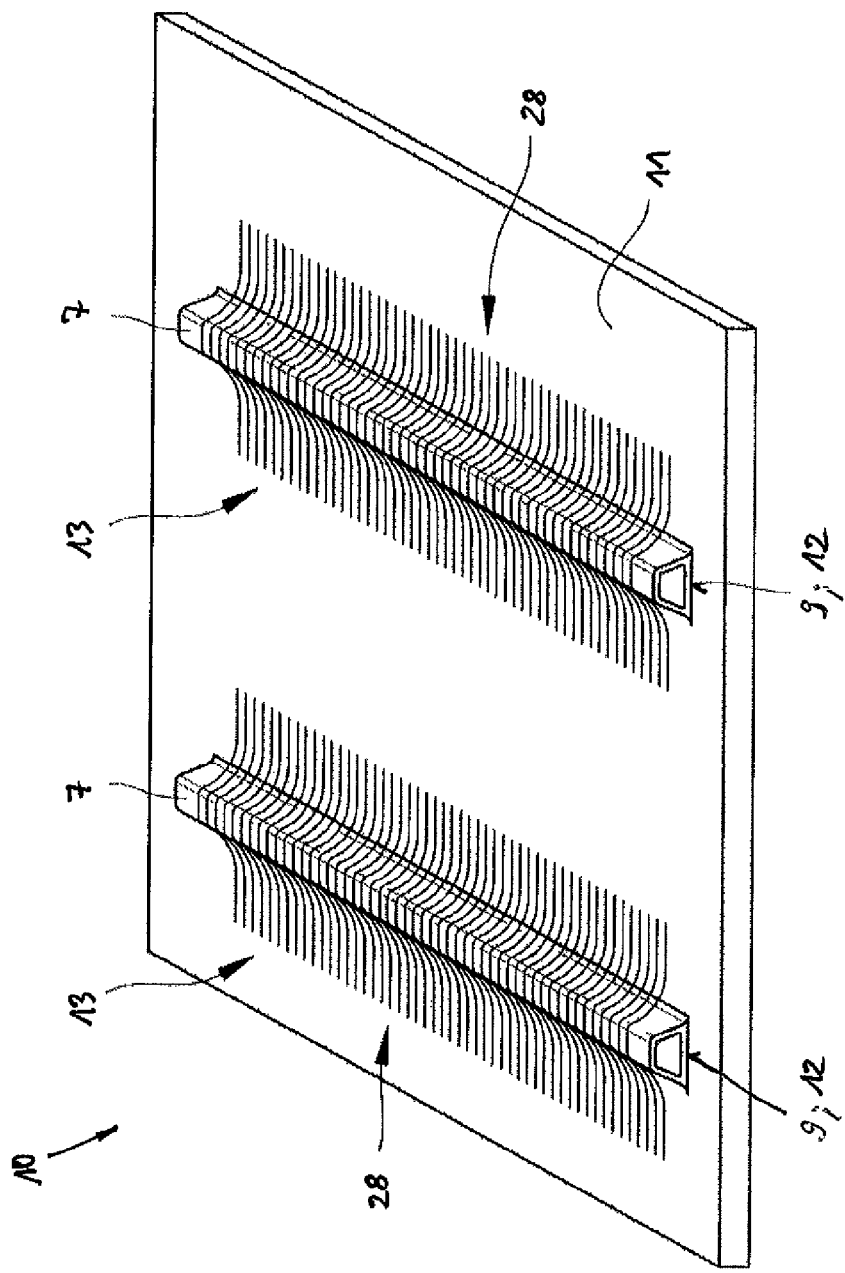
FIG. 13 is a schematic, perspective view of the embodiment of a fibre composite component according to the invention during production according to a second method of the invention.

However, the mould core 7 according to the invention which contains a cork material can also be used in a production process in which the reinforcing element 1 is directly formed on the base component 11. In this respect, FIG. 13 is a schematic perspective view of the embodiment of a fibre composite component 10 according to the invention during production according to a second method of the invention.

In this case, the mould core 7 is for example a configuration with a core inner space 18 according to the second embodiment of FIG. 6. Two mould cores 7 are arranged on the base component 11 with their base surfaces 9 contacting the respective inner surface portions 12. The mould cores 7 are covered with one or more layers of fibre semi-finished product 28 which are then impregnated with a matrix to form mould portions 13 with reinforcing elements. However, the fibre semi-finished product can also be pre-impregnated with resin and is then a prepreg. The curing procedure then takes place as explained above.

The invention is not restricted to the specific method illustrated in the figures for producing a fibre composite component for the aviation and aerospace industry.

Thus, for example, the present inventive concept can also be applied to fibre composite components in the sports equipment or motorsport sectors.

Furthermore, the shape of the mould core can be modified in many different ways.

In addition, a plurality of mould cores can be used to form one mould core. In this respect, the objective is to provide a more complex geometry by means of the large number of mould cores. As a result, it is possible to produce more complex fibre composite components.

Other reinforcement profiled parts, for example T-stringers, L-stringers, U-stringers, pipes, mixed forms of the mentioned profiled parts and the like can also be supported with the mould core 7 according to the invention consisting of a cork-containing material as the supporting core. For this purpose, the mould core 7 has the respective cross section or the respective shape of the reinforcement profiled part portion which is to be supported. Fixing can be carried out, for example as above according to FIG. 11 or 12.

Figure 14:
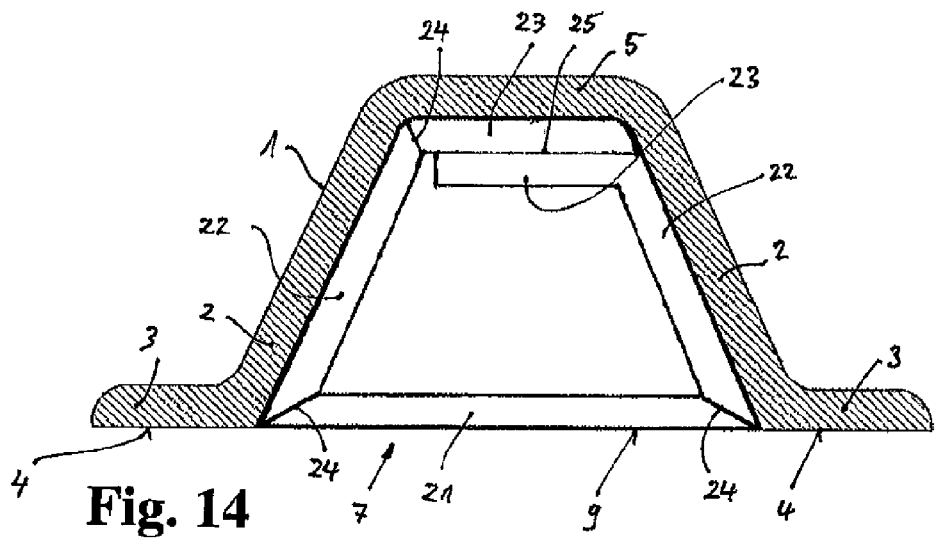
FIG. 14 is a schematic cross-sectional view of a fifth embodiment of the mould core according to the invention with the reinforcing element according to FIG. 1.

As shown in FIG. 14 in a schematic cross-sectional view of a fifth embodiment of the mould core according to the invention with the reinforcing element according to FIG. 1, the folded core according to FIG. 8 can also have in the head region a planar overlap of two head walls 23 with a joining portion 25 over a large area. This configuration is particularly suitable for reinforcing elements 1 which have already cured and the head region of which no longer has to be formed by the mould core 7.

Instead of a fold core, this can also be composed of individual plates.

Figure 15A:
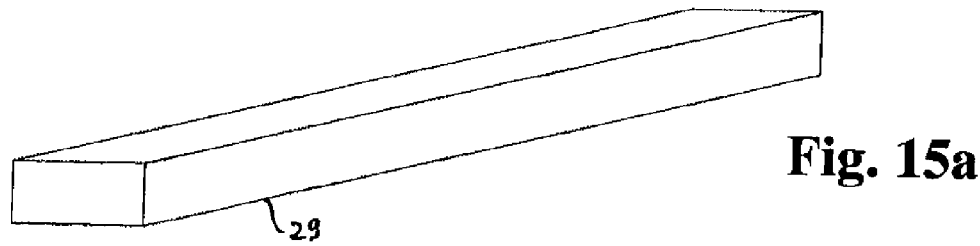
FIG. 15a is a schematic, perspective view of a core blank for a variation of the second embodiment of the mould core of the invention according to FIG. 6.
Figure 15B:
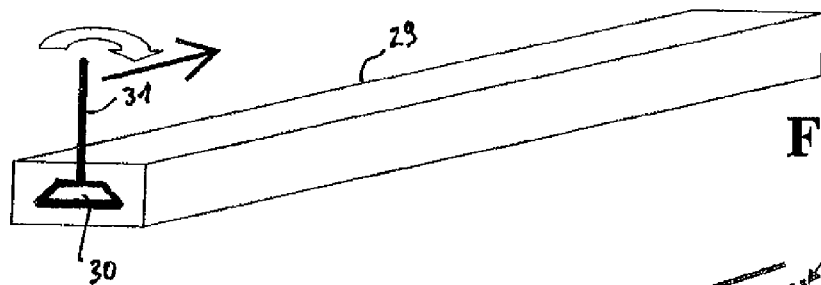
Figure 15C:
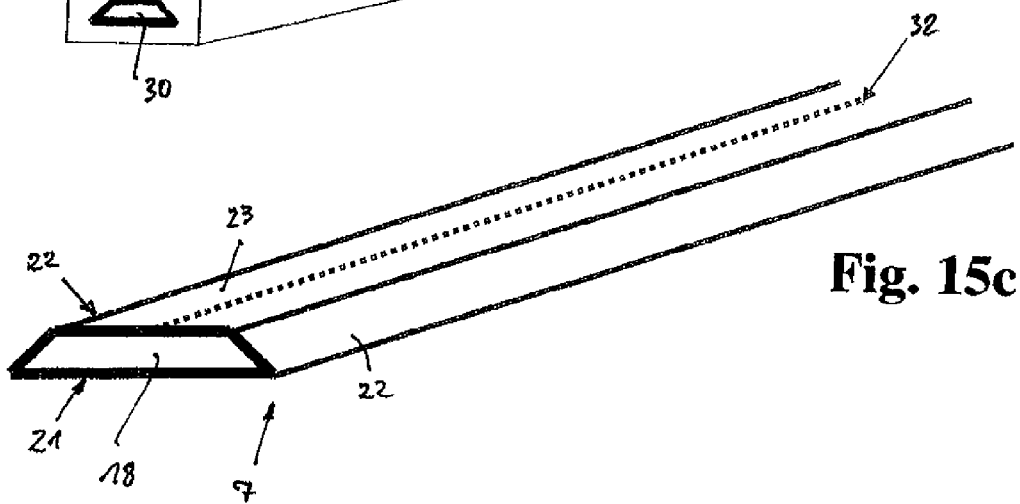
FIG. 15c is a schematic, perspective illustration of a variation of the second embodiment of the mould core of the invention according to FIG. 6.

It is also possible to produce the mould core 7 from a solid material. In this respect, FIGS. 15a to 15c are schematic perspective views of a core blank 29 for a variation of the second embodiment of the mould core according to the invention of FIG. 6, the processing and final shape thereof. In this respect, the formation of this mould core 7 as a hollow core with an inner space 18 comprises the following sub-steps: provision of a core blank 29 or solid profiled part which is produced, for example in a compression moulding process. The outer and inner contours of the mould core 7 are produced by milling and/or cutting tools 30, for example. The external shape of the milling and/or cutting tool 30 for forming the inner space 18 of the core corresponds to the geometrical cross section of the core inner space 18. The rotating milling and/or cutting tool 30 is moved in the solid profiled part in the longitudinal direction thereof, the shank 31 of the milling and/or cutting tool 30 simultaneously making a longitudinal slot 32 in the head wall 23 of the mould core produced thus. This longitudinal slot 32 can be closed either by an affixed strip of a cork-containing material and/or by a fixing element 26 (see, for example FIG. 11, 12) with magnetic strips. The outer shape of the mould core 7 which is to be adapted to the inner shape of the reinforcing element 1 is produced by a corresponding machining, for example by milling and/or cutting of the core blank 29. However, the core blank 29 can also already be provided with the final outer profile.

The invention provides a method for producing a fibre composite component 10, in particular for the aviation and aerospace industry, which comprises the following steps: forming a mould core 7 from a cork-containing material using a core tool 14 to establish an outer shape of the mould core 7; arranging the mould core 7 formed thus such that it rests against an at least part-cured reinforcing element 1 on a base component 11 of the fibre composite component 10 to be produced to form at least one mould portion 13 of the fibre composite component 10 to be produced; and charging in multiple stages at least the mould portion 13 with heat and/or pressure to produce the fibre composite component 10; and the invention also provides a mould core 7 and a fibre composite component 10.

PREFERRED EMBODIMENTS OF THE PRESENT INVENTION

1. Method for producing a fibre composite component, in particular for the aviation and aerospace industry, which comprises the following steps: forming a mould core from a cork-containing material using a core tool to establish an outer shape of the mould core; arranging the mould core formed thus such that it rests against an at least part-cured reinforcing element, on a base component of the fibre composite component to be produced to form at least one mould portion of the fibre composite component to be produced; and charging in multiple stages at least the mould portion with heat and/or pressure to produce the fibre composite component.

2. Method according to embodiment 1, wherein the at least one fixing element is provided for fixing the mould core on the reinforcing element.

3. Method according to embodiment 2, wherein the at least one fixing element is attached to the mould core and it cooperates with at least one fixing aid element which can be removably attached to the reinforcing element, and for example the at least one fixing element and the at least one fixing aid element are formed by magnetic strips.

4. Method for producing a fibre composite component, in particular for the aviation and aerospace industry, which comprises the following steps: forming a mould core from a cork-containing material using a core tool to establish an outer shape of the mould core; arranging the mould core formed thus on a base component of the fibre composite component to be produced and laying down at least in portions at least one fibre semi-finished product on the formed mould core to form at least one mould portion of the fibre composite component to be produced; and charging in multiple stages at least the mould portion with heat and/or pressure to produce the fibre composite component.

5. Method according to at least one of the preceding embodiments, wherein the mould core is at least partly formed with at least one reinforcing layer consisting of tear-proof woven fabric and/or a tear-proof separating film.

6. Method according to at least one of the preceding embodiments, wherein during the formation of the mould core, reinforcing means are arranged in the region of transitions, to be formed with sharp edges, of the outer shape of the mould core to be formed.

7. Method according to at least one of the preceding embodiments, wherein during and/or after the formation of the mould core, a separating layer is applied to the mould core which is produced, for example by machining procedures by means of grinding and/or polishing and/or an additionally applied separating film and/or a liquid separating agent.

8. Method according to at least one of the preceding embodiments, wherein the mould core is composed of at least two core segments.

9. Method according to at least one of the preceding embodiments, wherein the mould core is formed as a hollow core with a core inner space.

10. Method according to at least one of the preceding embodiments, wherein the formation of the mould core comprises the following sub-steps: provision of sheet material; cutting blanks to size; folding the blanks with a folding tool; and joining the blanks by means of the core tool.

11. Method according to at least one of embodiments 1 to 9, wherein the mould core is formed by a compression moulding process.

12. Mould core for producing a fibre composite component, in particular a reinforcing element on a base component for the aviation and aerospace industry, wherein the mould core is formed using a cork-containing material.

13. Mould core according to embodiment 12, wherein the mould core is produced by a method according to at least one of embodiments 1 to 11.

14. Fibre composite component with at least one reinforcing element, in particular for the aviation and aerospace industry, which is produced by a mould core according to embodiment 12 or 13 and/or by a method according to at least one of embodiments 1 to 11.

15. Fibre composite component according to embodiment 14, wherein the mould core is arranged such that it rests against the at least one reinforcing element as a sound absorber, a thermal insulating element, and/or to improve the impact behaviour and/or the burn-through behaviour.

LIST OF REFERENCE NUMERALS 1 reinforcing element
2 web
3 foot
4 joining surface
5 head
6 cavity
7 mould core
8 side face 9 base surface of mould core
10 fibre composite component
11 base component
12 inner surface portion
13 mould portion
14 core tool
15 separating layer
16 reinforcing layer
17 reinforcing means
18 core inner space
19 core segment
20 sheet material
21 base wall
22 side wall
23 head wall
24 fold portion
25 joining portion
26 fixing element
27 fixing aid element
28 fibre semi-finished product
29 core blank
30 milling and/or cutting tool
31 shank
32 longitudinal slot

The invention claimed is:

1. A method for producing a fibre composite component for the aviation and aerospace industry, which comprises the following steps:

forming a mould core by a compression moulding process using a core tool for establishing an outer shape of the mould core, wherein the mould core is formed from a cork-containing material as a solid profiled part or as a hollow core with a core inner space, wherein the cork-containing material consists of a cork powder mixed with a binder and filler or a compound of cork granules and rubber granules, wherein the cork containing material is introduced into the core tool and brought into the desired shape with the cross section of the mould core, and wherein the mould core is provided with at least one fixing element;

arranging the mould core formed thus such that it rests against an at least part cured reinforcing element on a base component of the fibre composite component to be produced for forming at least one mould portion of the fibre composite component to be produced, and for fixing the mould core on the reinforcing element, the at least one fixing element of the mould core cooperates magnetically with at least one fixing aid element which is removably attached to the reinforcing element; and charging in multiple stages at least the mould portion with heat and/or pressure to produce the fibre composite component;

wherein the mould core is at least partly provided with a reinforcing layer consisting of tear-proof woven fabric, and wherein the reinforcing layer forms a separating layer preventing the material of the mould core from adhering to the core tool during forming or the reinforcing element during charging.

2. The method according to claim 1, wherein the at least one fixing element and the at least one fixing aid element are formed as magnetic strips or metal strips.

3. The method according to claim 1, wherein during and/or after the formation of the mould core, a separating layer is applied to the mould core which is produced for example by machining procedures by grinding and/or polishing and/or an additionally applied separating film and/or a liquid separating agent.

4. The method according to claim 1, wherein the formation of the mould core comprises the following sub-steps: providing sheet material; cutting blanks to size; folding the blanks using a folding tool; and joining the blanks by the core tool.

5. A mould core for producing a fibre composite component for the aviation and aerospace industry, wherein the mould core is formed by a compression moulding process from a cork-containing material as a solid profiled part or as a hollow core with a core inner space, wherein the cork-containing material consists of a cork powder mixed with a binder and filler or a compound of cork granules and rubber granules, and wherein the mould core is provided with at least one fixing element, wherein the mould core is at least partially provided with a reinforcing layer consisting of a tear-proof woven fabric, and wherein the reinforcing layer forms a separating layer preventing the material of the mould core from adhering to the core tool during forming or a reinforcing element during charging.

6. The mould core according to claim 5, wherein the mould core is provided with reinforcing elements in the region of sharp-edged transitions of its outer shape.

7. The mould core according to claim 5, wherein the mould core is composed of at least two core segments.

8. The mould core according to claim 5, wherein the mould core is formed from folded blanks of a sheet material.

* * * * *